US010282309B2

(12) United States Patent
Jayasena et al.

(10) Patent No.: US 10,282,309 B2
(45) Date of Patent: May 7, 2019

(54) PER-PAGE CONTROL OF PHYSICAL ADDRESS SPACE DISTRIBUTION AMONG MEMORY MODULES

(71) Applicant: Advanced Micro Devices, Inc., Sunnyvale, CA (US)

(72) Inventors: Nuwan S. Jayasena, Sunnyvale, CA (US); Hyojong Kim, Atlanta, GA (US); Hyesoon Kim, Atlanta, GA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/441,532

(22) Filed: Feb. 24, 2017

(65) Prior Publication Data
US 2018/0246814 A1    Aug. 30, 2018

(51) Int. Cl.
*G06F 12/10*    (2016.01)
*G06F 12/1027*    (2016.01)
(Continued)

(52) U.S. Cl.
CPC ...... *G06F 12/1027* (2013.01); *G06F 12/1009* (2013.01); *G06F 12/0623* (2013.01); *G06F 2212/656* (2013.01); *G06F 2212/68* (2013.01)

(58) Field of Classification Search
CPC ............. G06F 12/1027; G06F 12/1009; G06F 2212/656; G06F 2212/68; G06F 12/0607; G06F 12/0623; G06F 13/1647
See application file for complete search history.

(56) References Cited

U.S. PATENT DOCUMENTS 5,454,091 A * 9/1995 Sites ................. G06F 12/1027
                                                           711/118
5,526,504 A   6/1996 Hsu et al.
(Continued)

OTHER PUBLICATIONS

Yoon et al, "Adaptive Granularity Memory Systems: A Tradeoff between Storage Efficiency and Throughput," 2011 International Symposium on Computer Architecture (ISCA '11), Jun. 4-8, 2011, San Jose, California, pp. 295-306.*
(Continued)

*Primary Examiner* — Glenn Gossage
(74) *Attorney, Agent, or Firm* — Meyertons Hood Kivlin Kowert and Goetzel PC; Rory D. Rankin

(57) ABSTRACT

Systems, apparatuses, and methods for implementing per-page control of physical address space distribution among memory modules are disclosed. A computing system includes a plurality of processing units coupled to a plurality of memory modules. A determination is made as to which physical address space distribution granularity to implement for physical memory pages allocated for a first data structure. The determination can be made on a per-data-structure basis (e.g., file, page, block, etc.) or on a per-application-basis. A physical address space distribution granularity is encoded as a property of each physical memory page allocated for the first data structure, and physical memory pages of the first data structure distributed across the plurality of memory modules based on a selected physical address space distribution granularity. Page table entries (PTEs) may be annotated with the selected physical address space distribution granularity, using an addressing mapping granularity (AMG) field of a page table entry, where the granularity may be, for example, a fine-grain distribution granularity or a coarse-grain distribution granularity.

20 Claims, 11 Drawing Sheets

(51) Int. Cl.
*G06F 12/1009* (2016.01)
*G06F 12/06* (2006.01)

(56) References Cited

U.S. PATENT DOCUMENTS

| | | | |
|---|---|---|---|
| 5,752,275 A | 5/1998 | Hammond | |
| 5,907,867 A | 5/1999 | Shinbo et al. | |
| 6,112,285 A | 8/2000 | Ganapathy et al. | |
| 6,567,900 B1* | 5/2003 | Kessler | G06F 12/0831 711/148 |
| 7,437,529 B2 | 10/2008 | Burugula et al. | |
| 7,747,838 B2 | 6/2010 | Hepkin et al. | |
| 7,793,070 B2 | 9/2010 | Stecher | |
| 7,805,587 B1* | 9/2010 | Van Dyke | G06F 12/10 711/202 |
| 7,873,792 B2 | 1/2011 | Anand et al. | |
| 8,195,917 B2 | 6/2012 | Hohmuth et al. | |
| 8,429,377 B2 | 4/2013 | Chen et al. | |
| 2002/0133685 A1 | 9/2002 | Kalyanasundharam | |
| 2003/0014609 A1* | 1/2003 | Kissell | G06F 12/1027 711/206 |
| 2004/0117594 A1 | 6/2004 | Vanderspek | |
| 2006/0069899 A1 | 3/2006 | Schoinas et al. | |
| 2006/0075146 A1 | 4/2006 | Schoinas et al. | |
| 2006/0174053 A1 | 8/2006 | Anderson et al. | |
| 2007/0067604 A1 | 3/2007 | Elnozahy et al. | |
| 2007/0180215 A1 | 8/2007 | Cascaval et al. | |
| 2008/0288742 A1 | 11/2008 | Klepkin et al. | |
| 2009/0013149 A1 | 1/2009 | Uhlig et al. | |
| 2009/0019254 A1 | 1/2009 | Stecher | |
| 2009/0150624 A1 | 6/2009 | Resnick | |
| 2009/0172344 A1 | 7/2009 | Grochowski et al. | |
| 2010/0332775 A1* | 12/2010 | Kapil | G06F 12/0607 711/157 |
| 2011/0055458 A1 | 3/2011 | Kuehne | |
| 2011/0138149 A1 | 6/2011 | Karlsson et al. | |
| 2012/0059983 A1 | 3/2012 | Nellans et al. | |
| 2013/0036273 A1* | 2/2013 | Shaeffer | G06F 13/16 711/148 |
| 2013/0238874 A1 | 9/2013 | Avudaiyappan et al. | |
| 2013/0238875 A1 | 9/2013 | Ramaraju et al. | |
| 2016/0048327 A1* | 2/2016 | Jayasena | G06F 13/1647 711/112 |
| 2018/0046583 A1 | 2/2018 | Bybell et al. | |
| 2018/0074715 A1 | 3/2018 | Farmahini-Farahani et al. | |

OTHER PUBLICATIONS

Frico, et al., "FFTW: An Adaptive Software Architecture for the FFT", Proceedings of the 1998 IEEE International Conference on Acoustics, Speech and Signal Processing, May 15, 2998, 4 pages.

Volos, et al., "BUMP: Bulk Memory Access Prediction and Streaming", in Proceedings of the 47th Annual IEEE/ACM International Symposium on Microarchitecture, Dec. 13-17, 2014, 13 pages.

Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.

Awathi, et al., "Prediction Based Dram Row-Buffer Management in the Many-Core Era", International Conference on Parallel Architectures and Compilation Techniques, Oct. 10-14, 2011, 2 pages.

Erlingsson, et al., "A Cool and Practical Alternative to Traditional Hash Tables", Proc. 7th Workshop on Distributed Data and Structures (WDAS'06), Jan. 2006, 6 pages.

International Search Report and Written Opinion in International Application No. PCT/US10/40625, dated Aug. 30, 2010, 8 pages.

Lim et al, "Disaggregated Memory for Expansion and Sharing in Blade Servers", Proceedings of the 36th Annual International Symposium on Computer Architecture, Jun. 29, pp. 267-278, https://web.eecs.umich.edu/~twenisch/papers/isca09-disaggregate.pdf. [Retreived Jun. 22, 2018].

Mirza et al., U.S. Appl. No. 15/433,560, entitled "Selecting a Default Page Size in a Variable Page Size TLB", filed Feb. 15, 2017, 30 pages.

Non-Final Office Action in U.S. Appl. No. 15/433,560, dated Jun. 28, 2018, 7 pages.

\* cited by examiner

PER-PAGE CONTROL OF PHYSICAL ADDRESS SPACE DISTRIBUTION AMONG MEMORY MODULES

The invention described herein was made with government support under contract number DE-AC52-07NA27344, subcontract number B608045 awarded by the United States Department of Energy. The United States Government has certain rights in the invention.

BACKGROUND

Description Of The Related Art

Some computing systems with a unified address space include subsets of compute units which are in close physical proximity to memory modules. For example, increasingly large systems-on chip (SoCs) and emerging silicon manufacturing and assembly technologies such as chiplet-based designs and three-dimensional (3D) die-stacking are being developed. This is leading to systems where some main memory modules have a closer association with some processing elements or cores of a processor. As processor chip sizes grow, global data movement even within a processor chip is becoming increasingly expensive from performance and energy perspectives. However, arbitrarily distributing computation and data across core clusters and memory modules disregards the physical proximity between core clusters and memory interfaces and generates large amounts of global on-chip traffic within the processor. Also, performing these global memory accesses incurs high performance and energy penalties.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
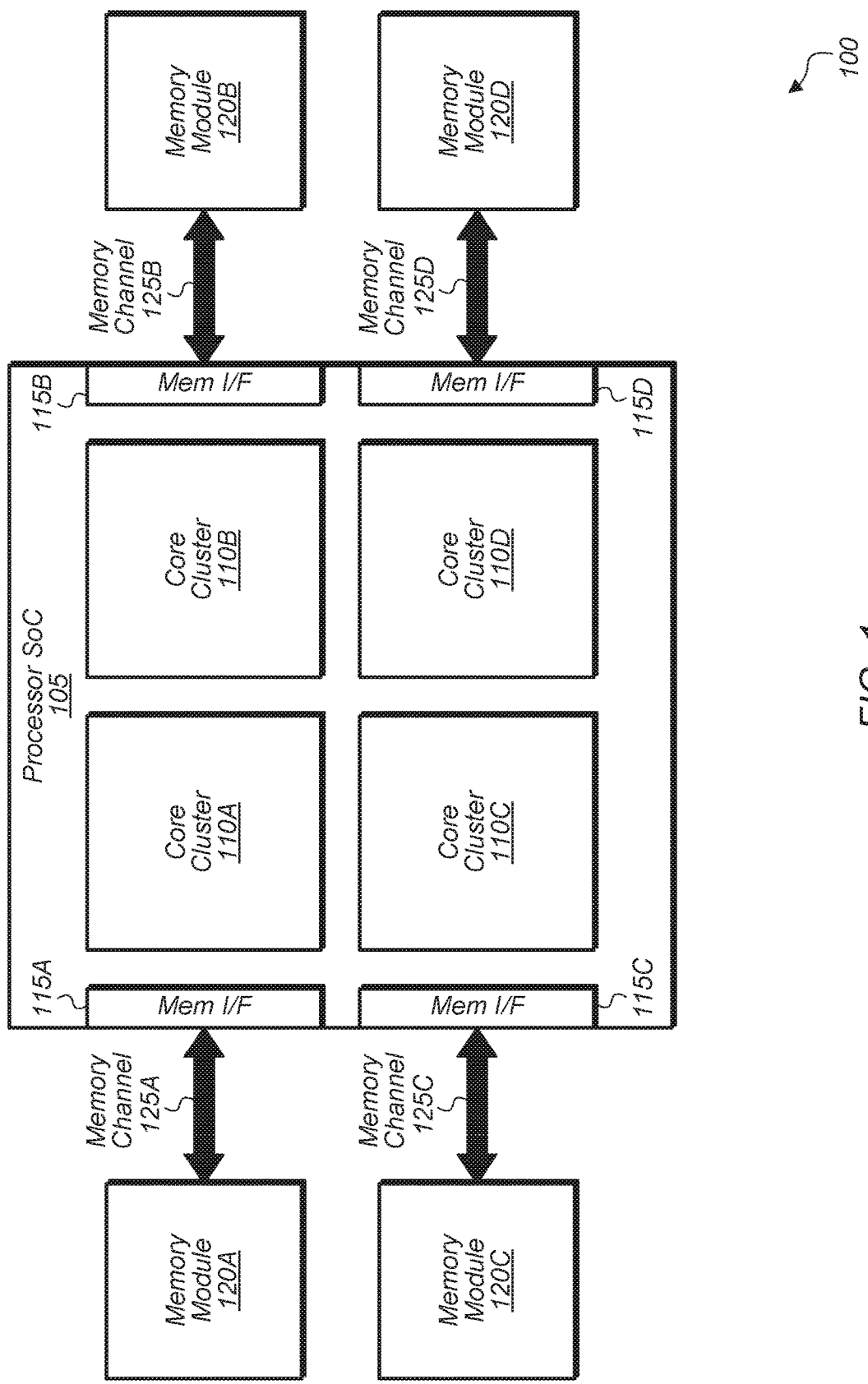
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing per-page control of physical address space distribution among memory modules are disclosed herein. In one embodiment, a system includes a plurality of processing units coupled to a memory subsystem that includes a plurality of memory modules. A determination is made as to which granularity to use when distributing physical addresses among the plurality of memory modules. As will be discussed below, at least a coarse granularity and a fine granularity may be used. The determination can be made on a per-data-structure basis (e.g., file, page, block, etc.) or on a per-application-basis. The determination can be based at least in part on various sources of information such as directives or hints provided by the application, compile-time analysis of the application, profiling-based analysis of the application, and/or other factors. In various embodiments, the system is configured to encode a physical address space distribution granularity as a property of each physical memory page allocated for a first data structure. The system is also configured to distribute physical memory pages of the first data structure across the plurality of memory modules based on a selected physical address space distribution granularity.

In one embodiment, the physical address space distribution granularity can be specified as either a fine-grain region (FGR) or a coarse-grain region (CGR). A data structure can be migrated from FGR to CGR, or vice-versa, as more information about application behavior becomes available during execution. In general, a data structure that is likely to be accessed by a single execution unit is allocated and mapped to CGR physical pages in a memory module relatively close to that execution unit as compared to other memory modules. Data structures that are likely to be shared by many execution units, or those data structures whose access patterns from various execution units cannot be determined, are mapped to FGR physical pages.

Generally speaking, a "fine-grain distribution" refers to mapping pages to more memory modules than in a "coarse-grain distribution." For example, a fine-grain distribution may map smaller contiguous regions of the physical address space (e.g., single pages) to different memory modules. In this manner, a first page may be mapped to a first memory module, a second page mapped to a second memory module, and so on. In contrast, a coarse-grain distribution may map larger contiguous regions (e.g., blocks of two or more contiguous pages) of the physical address space to memory modules. In one embodiment, a fine-grain distribution uses lower-order address bits to map pages to memory modules and a coarse-grain distribution uses higher-order address bits to map pages to memory modules.

Referring now to FIG. 1, a block diagram of one embodiment of a computing system 100 is shown. In one embodiment, computing system 100 includes a processor system on chip (SoC) 105 with four core clusters 110A-D and four off-chip memory modules 120A-D. Each core cluster 110A-D includes any number of processor cores, with the number of cores per cluster varying from embodiment to embodiment. It is noted that each core cluster 110A-D can also be referred to as a "processing unit". Each memory module 120A-D is connected to the processor SoC 105 via a corresponding memory channel 125A-D and corresponding memory interface unit 115A-D. In one embodiment, processor SoC 105 employs a shared physical address space such that any core in any core cluster 110A-D can access any of the memory modules 120A-D. However, arbitrarily distributing computation and data across core clusters 110A-D and memory modules 120A-D disregards the physical proximity between core clusters and memory interfaces 115A-D and generates large amounts of global on-chip traffic within the processor 105.

Instead, if the data that core cluster 110A operates on can be placed on memory module 120A, if the data that core cluster 110B operates on can be placed on memory module 120B and so on, the physical proximity between core clusters and memory interfaces can be exploited to greatly reduce global on-chip traffic. However, such localization of data is not achieved in current systems as the physical address space is typically distributed among all available memory channels at a fine granularity (e.g., individual cache lines) to ensure balanced utilization of all memory channels. However, this distribution ensures any contiguous data structure is striped across all memory modules 120A-D regardless of what core cluster 110A-D will access the data, essentially preventing the possibility of exploiting the physical proximity between core clusters 110A-D and memory interfaces 115A-D on the processor SoC 105. As used herein, a "data structure" is defined as a format for organizing and storing data. General data structure types include the array, the file, the record, the table, the tree, and so on. A data structure is designed to organize data to suit a specific purpose so that the data structure can be accessed and worked on in appropriate ways.

Processor SoC 105 can be implemented as any number and type of processing units (e.g., central processing unit (CPU), graphics processing unit (GPU), digital signal processor (DSP), field programmable gate array (FPGA), application specific integrated circuit (ASIC)) that perform computational and memory operations responsive to the execution of instructions associated with application software stored in memory, such as any of memory modules 120A-D or other system memory not shown in FIG. 1. Processor SoC 105 can implement any suitable instruction set architecture (ISA) (e.g., x86, ARM™, MIPS™, PowerPC™). In one embodiment, the processor SoC 105 is configured to execute the main control software of system 100, such as an operating system. Generally, software executed by processor SoC 105 during use can control the other components of system 100 to realize the desired functionality of system 100. Memory modules 120A-D can include any of various types of memory, including, but not limited to, Dynamic Random Access Memory (DRAM), Static Random Access Memory (SRAM), NAND Flash memory, NOR flash memory, Ferroelectric Random Access Memory (FeRAM), or others.

Figure 2:
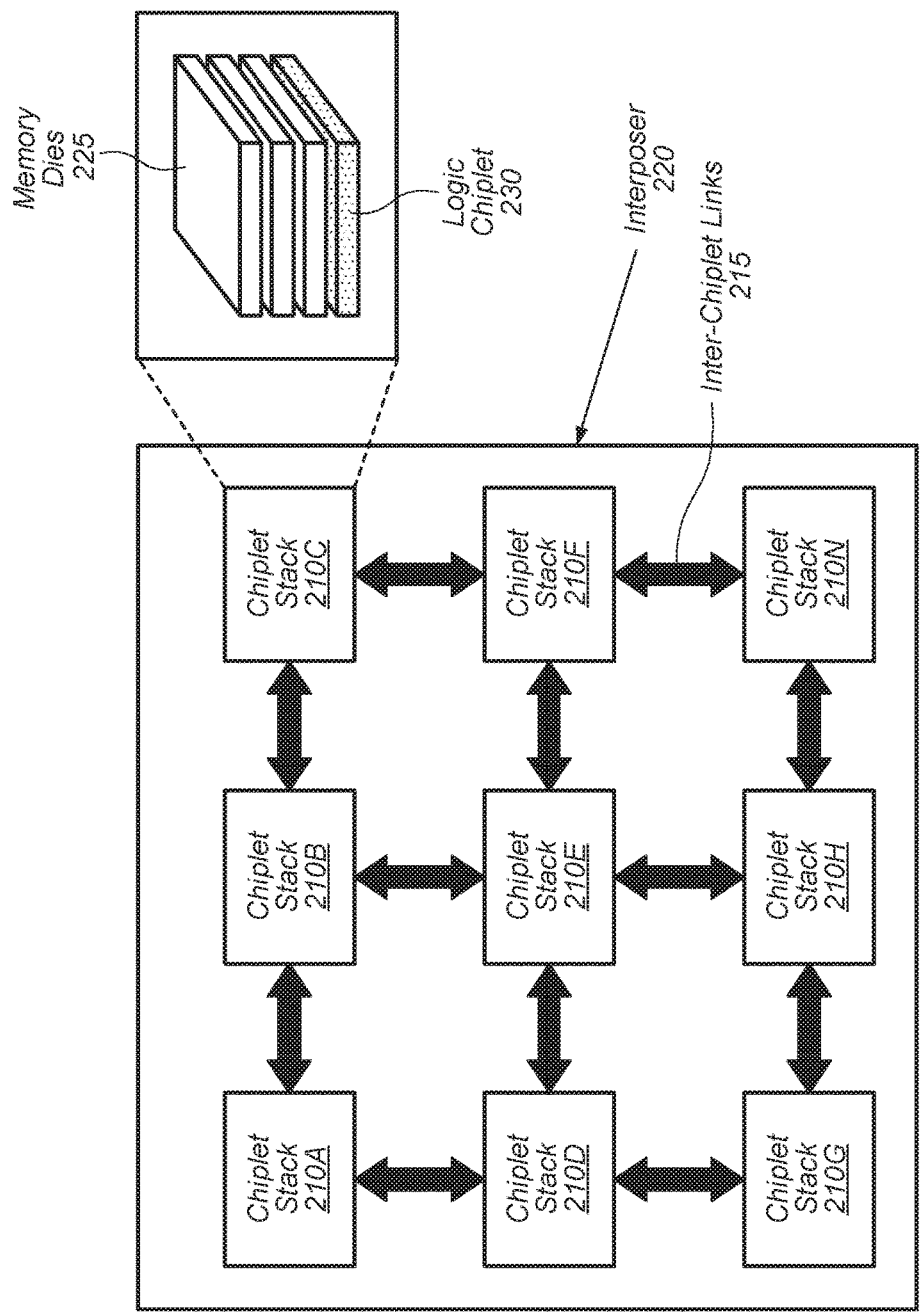
FIG. 2 is a block diagram of another embodiment of a computing system.

Turning now to FIG. 2, a block diagram of another embodiment of a computing system 200. FIG. 2 shows another example of a system 200 where ignoring data-compute locality can lead to a large amount of on-chip global traffic. In system 200, the compute resources of system 200 are partitioned into a collection of logic chiplet stacks 210A-N mounted side-by-side on an interposer 220. Further, memory dies 225 are 3D-stacked on top of each logic chiplet 230 to form each chiplet stack 210A-N. In some embodiments, multiple logic chiplets can be stacked vertically within each chiplet stack. The logic chiplets within a chiplet stack have high-bandwidth, low-energy access to the memory within the stack. However, providing uniform access from any logic chiplets to any memory of system 200 requires provisioning high global bandwidth on the inter-chiplet links 215 of interposer 220, and performing these global accesses incurs high performance and energy penalties.

Figure 3:
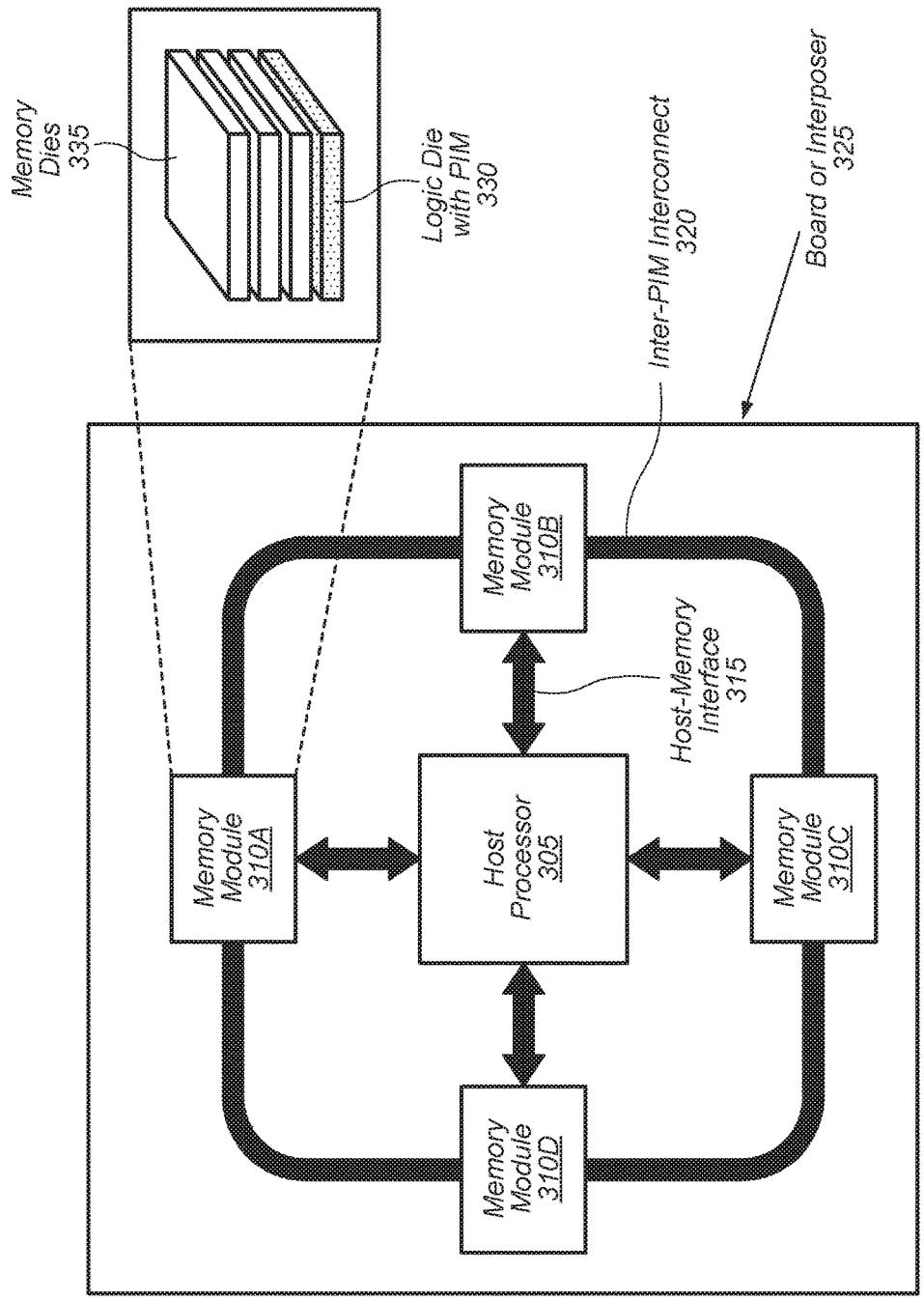
FIG. 3 is a block diagram of yet another embodiment of a computing system.

Referring now to FIG. 3, a block diagram of another embodiment of computing system 300. FIG. 3 illustrates yet another example of system 300 where ignoring data-compute locality can lead to a large amount of global traffic. It is noted that system 300 can also be referred to as a system on a chip (SoC). In system 300, a number of memory modules are attached to a host processor 305 via host-memory interfaces 315, and each memory module 310A-D incorporates processing in memory (PIM) or processing near memory. The host processor 305 in system 300 can include the components shown in the processor SoC 105 of FIG. 1. The host processor 305 and the memory modules 310A-D can be mounted on an interposer 325 or on a printed circuit board or other substrate. Each PIM device 330 has high-bandwidth, low-energy access to the memory dies 335 co-packaged with it within a single memory module. However, providing uniform access from any PIM to any memory via the inter-PIM interconnect 320 requires provisioning high global bandwidth on the interposer 325 or printed circuit board (or other substrate), and performing such global accesses incurs high performance and energy penalties.

In each of the above systems illustrated in FIGS. 1-3, the preferred method of distributing the unified physical address space among the multiple available memory modules depends on the anticipated data usage pattern. For data structures that are shared among multiple execution units (e.g., core clusters, chiplets, PIMs), distributing the shared address space among all available memory modules at a fine granularity helps balance data capacity across memory modules and minimizes the likelihood of bandwidth hotspots in a single memory module at any point in time. However, for data structures, or portions thereof, that are accessed predominantly by a single execution unit, it would be best to place that data on the memory module that is closest to that processing unit. This typically requires mapping a large, contiguous region of the unified physical address space to a single memory module. Therefore, the fine-grain address distribution among memory modules that is desirable for shared data precludes effectively exploiting the physical locality among compute and memory resources for data structures that are primarily accessed by a single execution unit. In the remainder of this disclosure, various methods and mechanisms will be described to address the conflicting requirements of evenly distributing traffic and capacity requirements among all available memory modules (which utilizes fine-grain address space distribution among memory modules) and minimizing global traffic by localizing data and compute (which involves allocating large, contiguous ranges of the physical address space to each memory module).

Figure 4:
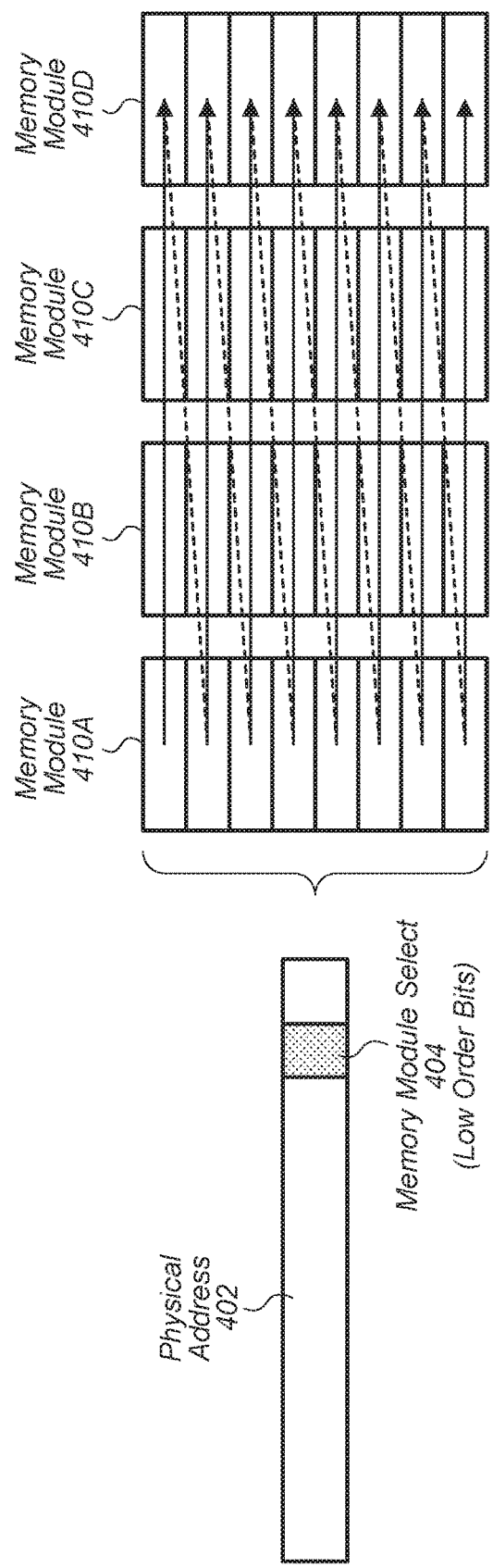
FIG. 4 is a block diagram of one embodiment of fine-grain physical address space distribution among memory modules.

Turning now to FIG. 4, a block diagram of one embodiment of fine-grain physical address space distribution among memory modules is shown. As shown in FIG. 4, a system distributes the physical address space among four memory modules 410A-D at a fine granularity (e.g., cache-line granularity). In one embodiment, the addresses are distributed among the memory modules 410A-D in a round-robin manner. In one embodiment, a few of the lower-order bits of physical address 402 are utilized to select which memory module 410A-D the address 402 is mapped to. These lower-order bits are shown as memory module select 404 of physical address 402.

Figure 5:
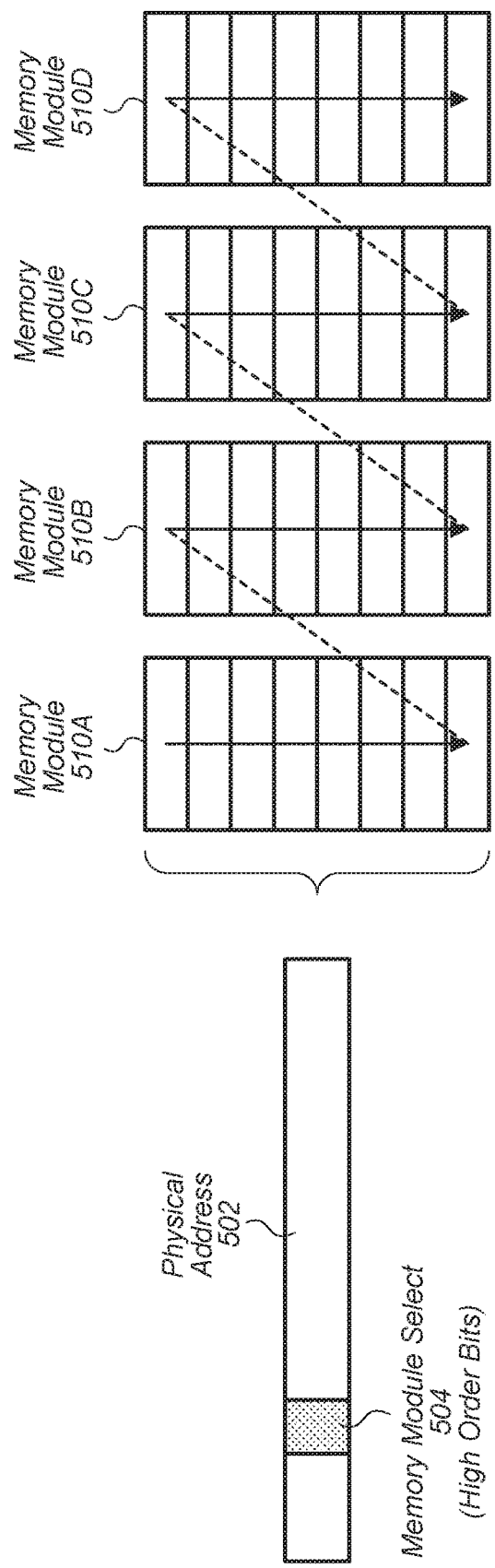
FIG. 5 is a block diagram of one embodiment of coarse-grain physical address space distribution among memory modules.

Referring now to FIG. 5, a block diagram of one embodiment of coarse-grain physical address space distribution among memory modules is shown. As shown in FIG. 5, the physical address space is distributed among four memory modules 510A-D at a coarse granularity. Accordingly, a large contiguous range of the physical address space is mapped to each memory module. In one embodiment, a few of the higher-order bits of the physical address 502 are utilized to select which memory module 510A-D the address 502 is mapped to. These higher-order bits are shown as memory module select 504 of physical address 502. It is noted that the memory module select 504 are different bits than the bits shown in FIG. 4 for memory module select 404. These higher-order bits used for memory module select 504 are closer to the most-significant bits (MSBs) of the physical address than the lower-order bits used for memory module select 404.

In one embodiment, a system supports both the address distribution granularity shown in FIG. 4 (referred to herein as fine-grain regions (FGR)) and the address distribution granularity shown in FIG. 5 (referred to herein as coarse-grain regions (CGR)). In another embodiment, a system supports more than two different types of address distribution granularities.

In one embodiment, a system includes an address mapping granularity (AMG) field in each page table entry (PTE). In embodiments with two different mapping granularities, the AMG field is a single bit and indicates whether the page is treated as FGR or CGR. In embodiments with more than two different mapping granularities, the AMG field is implemented with multiple bits to specify the mapping granularity. The PTEs are used by the system to map an application's virtual addresses to physical addresses used by the hardware to access memory. Each PTE maps a single virtual memory page to a single physical memory page, where a page is a range of contiguous memory addresses. The size of a page can vary according to the system architecture. In one embodiment, a page size of 4 kilobytes (KB) is utilized. In other embodiments, other page sizes can be utilized. In some embodiments, a system can support multiple different page sizes.

During allocation of memory data objects, a decision is made on whether to allocate the data objects in FGR pages or CGR pages. This decision can be made on a per-data-structure basis, on a per-application-basis, or at any other level. The decision can be based at least in part on various sources of information such as directives or hints provided by the application, compile-time analysis of the application, profiling-based analysis of the application, or others. A data structure can also be migrated from FGR to CGR or vice versa as more information about application behavior becomes available during execution of the application. In general, a data structure that is likely to be accessed by a single execution unit can be allocated and mapped to CGR physical pages in a memory module close to that execution unit. Data structures that are likely to be shared by many execution units or those whose access patterns from various execution units cannot be determined can be mapped to FGR physical pages.

When a data structure is to be allocated, the system software allocates the data structure to a suitably-sized region of the virtual address space. The system software then maps each virtual page of that region of virtual address space to a new physical page and annotates the new physical page with the appropriate distribution granularity (FGR or CGR) in the PTE that is created for the virtual to physical page mapping. If the data structure is allocated in virtual memory that is already mapped to physical pages, the operating system (OS) selects virtual pages that are mapped to physical pages with the appropriate distribution granularity (FGR or CGR) as desired by the application-level data structure allocation. If the data structure is mapped to virtual pages that are not already mapped to physical pages, then the new physical pages that those virtual pages are mapped to are annotated with the appropriate distribution granularity (FGR or CGR) in the PTEs that are set_up for the virtual to physical page mappings.

Figure 6:
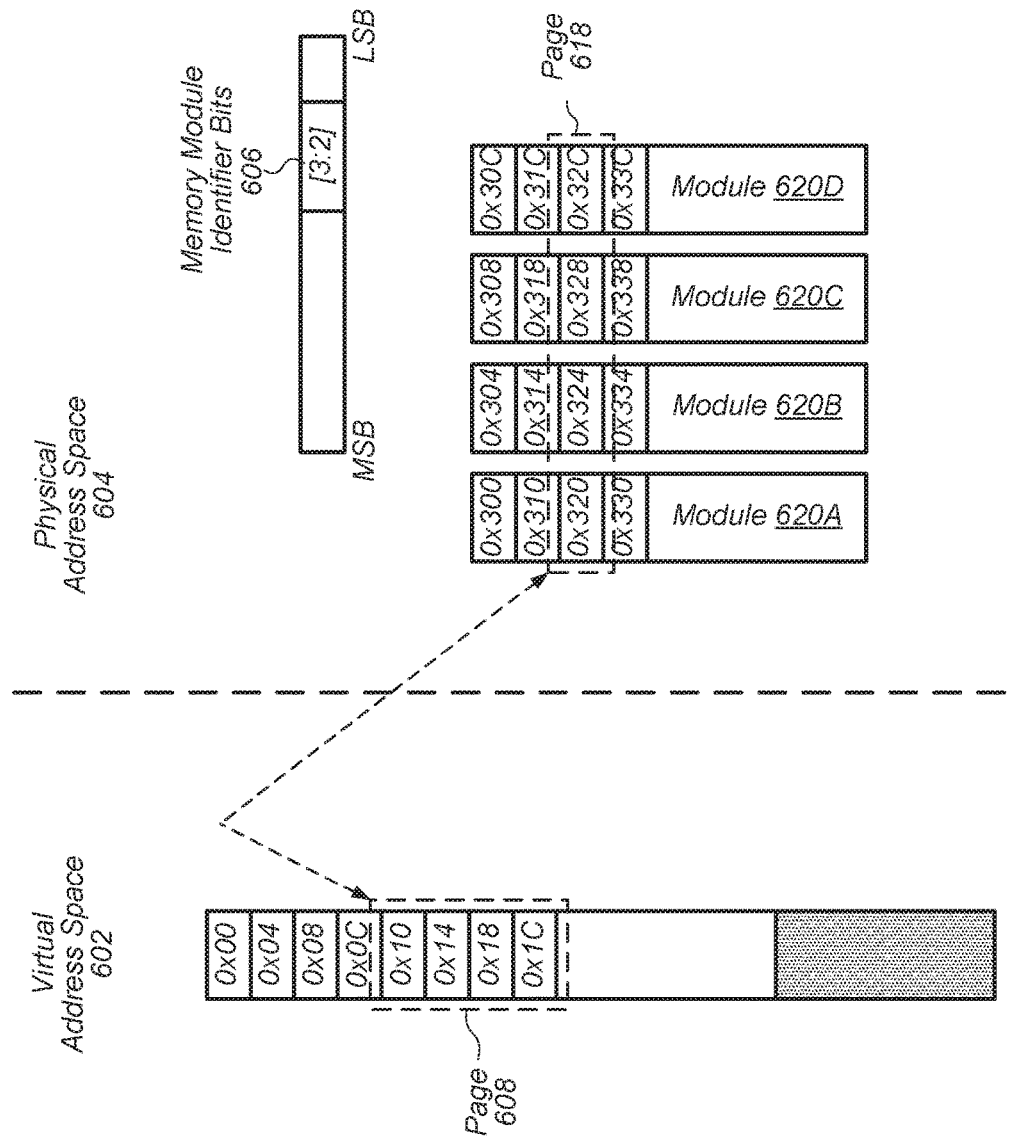
FIG. 6 is a block diagram of one embodiment of mappings from virtual address space to physical address space.

Turning now to FIG. 6, a block diagram of one embodiment of mappings from virtual address space 602 to physical address space 604 are shown. Virtual page 608 is shown within virtual address space 602, and virtual page 608 is mapped to physical page 618 within physical address space 604. The memory module identifier bits 606 of the physical address are used to select which memory module 620A-D the physical address is mapped to. In one embodiment, each memory module 620A-D is on a separate memory channel, and so the memory module identifier bits 606 can also be referred to as "memory channel identifier bits" or "channel identifier bits" since these bits are used to map the address to a corresponding memory channel. In one embodiment, the PTE which is created for the translation from virtual page 608 to physical page 618 is annotated with the FGR distribution granularity. In one embodiment, memory module identifier bits 606 are lower-order bits [3:2] of the physical address. This results in a fine-grain physical address space distribution among memory modules 620A-D, as illustrated by physical page 618 being striped across memory modules 620A-D. In other embodiments, other bits of the physical address can be utilized to determine how a page is mapped to memory modules 620A-D.

Figure 7:
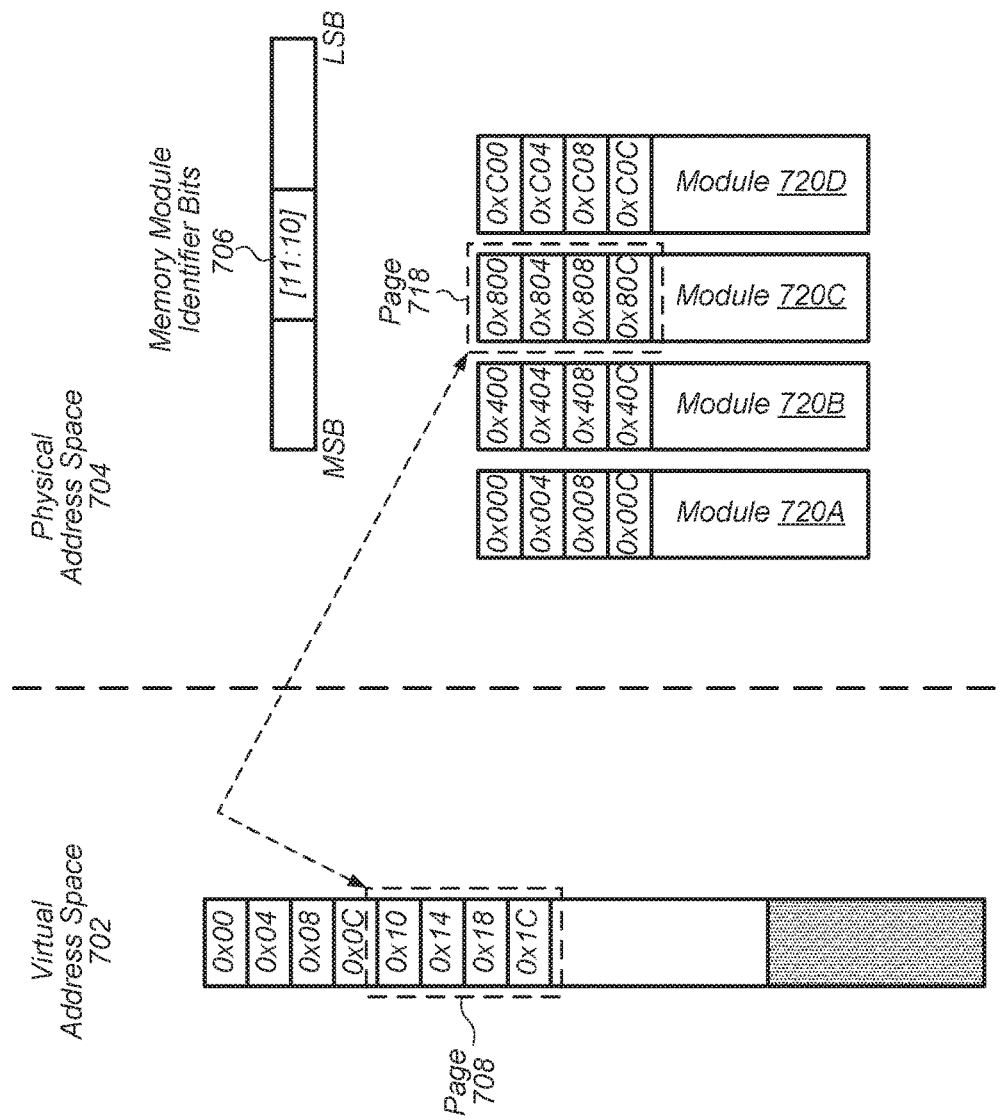
FIG. 7 is a block diagram of another embodiment of mappings from virtual address space to physical address space.

Referring now to FIG. 7, a block diagram of one embodiment of mappings from virtual address space 702 to physical address space 704 are shown. Virtual page 708 is shown within virtual address space 702, and virtual page 708 is mapped to physical page 718 within physical address space 704. The memory module identifier bits 706 of the physical address are used to select which memory module 720A-D the physical address is mapped to. In one embodiment, memory module identifier bits 706 are higher-order bits [11:10] of the physical address. It is noted that memory module identifier bits 706 are different than the memory module identifier bits 606 (of FIG. 6). This results in a coarse-grain physical address space distribution among memory modules 720A-D, as illustrated by physical page 718 being stored on only a single memory module 720C. This coarse-grain physical address space distribution is beneficial when a processing unit closely coupled to memory module 720C will be performing the majority of accesses to physical page 718. In one embodiment, the PTE which is created for the translation from virtual page 708 to physical page 718 is annotated with the FGR distribution granularity.

Figure 8:
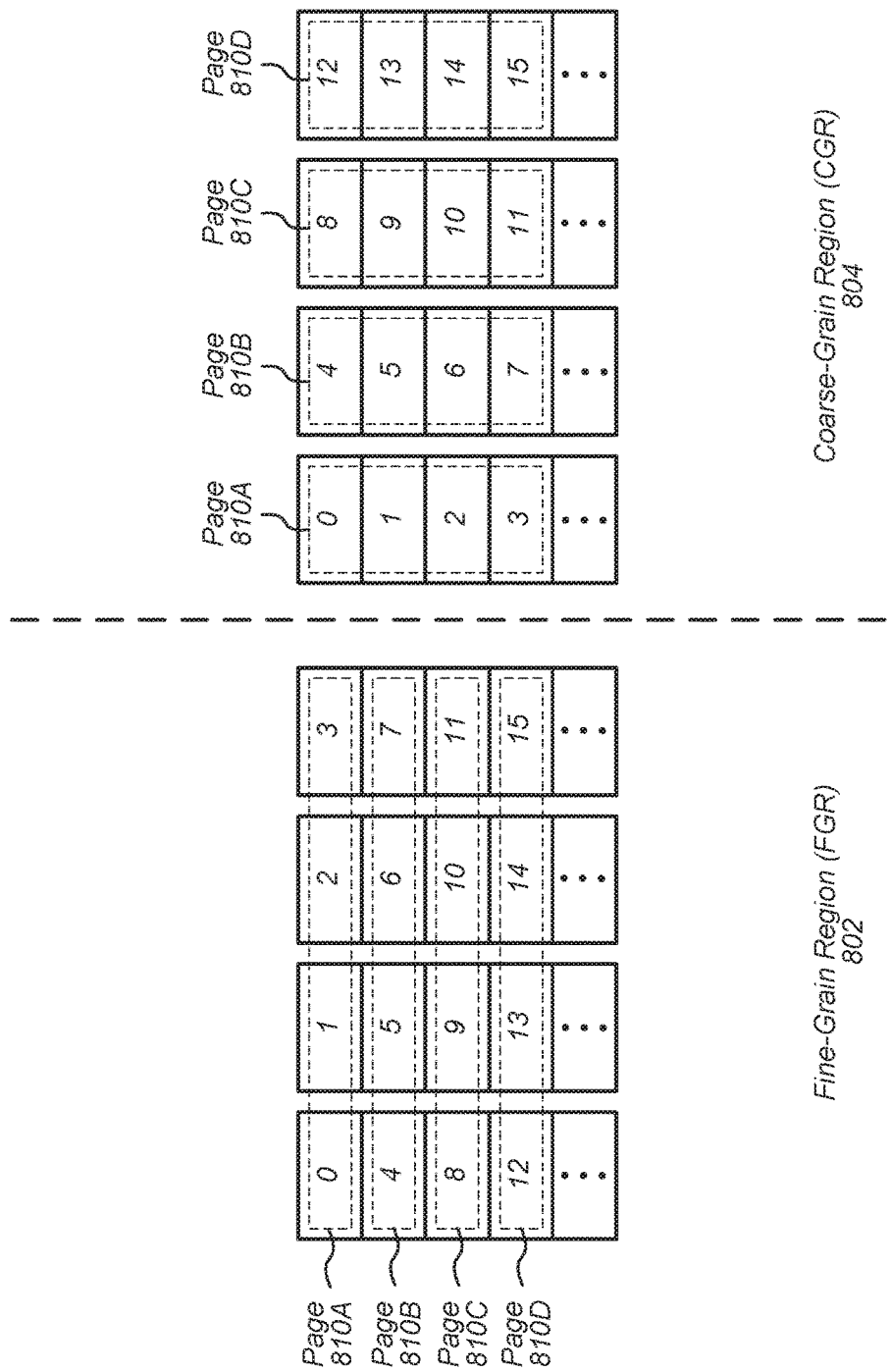
FIG. 8 is a block diagram of one embodiment of a set of pages spanning four memory modules in fine-grain region and coarse-grain region formats.

Turning now to FIG. 8, a block diagram of one embodiment of a set of pages spanning four memory modules in FGR and CGR formats is shown. When a page is converted from a FGR to CGR format, or vice versa, adjacent pages are also affected by the conversion. For example, to convert page 810A from the FGR format shown in FGR 802 on the left-side of FIG. 8, memory blocks 4, 8, and 12 on the first (or leftmost) memory module will also be affected by the conversion. Memory blocks 4, 8, and 12 are in pages 810B, 810C, and 810D, respectively, in FGR 802. As a result, the block of four pages 810A-D is converted from FGR 802 to CGR 804 as a single unit, with this single unit being referred to as a "page group" herein. In one embodiment, the number of pages in a page group is equal to the number of memory modules spanned by a single page in FGR layout spans.

The pages 810A-D are shown with each page being stored on a single memory module on the right-side of FIG. 8 in CGR 804. Converting from CGR to FGR is performed in a similar fashion as converting from FGR to CGR, with a page group being converted from CGR to FGR as a single unit. The memory blocks along the diagonal of a page group can remain in place during the conversion from a FGR layout to a CGR layout, or vice versa. These memory blocks are 0, 5, 10, and 15, which are in the same locations in the memory modules for both FGR 802 and CGR 804.

In one embodiment, a given virtual page is mapped to a physical page P that belongs to a page group G that is currently in a FGR. If the OS decides to convert the given virtual page to a CGR, the OS determines if any of the pages in page group G have valid data. If any of the pages of page group G have valid data, then the data of those pages is copied to other empty FGR pages and the virtual-to-physical mappings of those pages are updated so that the PTEs point to the new physical pages. If there are no empty FGR pages, then either an unused CGR block is converted to FGR or the contents of a page group are paged out to backing storage to free up space. Note that this will not affect application pointers as the virtual addresses remain unchanged. Additionally, when the OS decides to convert the given virtual page to a CGR layout, the OS annotates the PTE of the given virtual page to specify the CGR layout. Also, the OS adds all other pages of page group G to the list of available unused CGR pages.

In another embodiment, when a given virtual page, specified as being allocated in a FGR, is mapped to a physical page P' that belongs to page group G' that is currently in a CGR, the OS determines if any of the pages in G' have valid data. If any of the pages in G' have valid data, the valid data is copied to other empty CGR pages and the virtual-to-physical mappings are updated for these pages so that the PTEs point to the new physical pages. If there are no empty CGR pages, either an unused FGR block is converted to CGR or the contents of the page group are paged out to backing storage to free up space. Note that this does not affect application pointers as the virtual addresses remain unchanged. Also, the given virtual page is mapped to P' and the PTE of the given virtual page is annotated to indicate the FGR layout. Still further, all other pages of G' are added to the list of available unused FGR pages. In one embodiment, the OS maintains separate free lists of FGR and CGR page groups and pages. For embodiments with more than two different types of distribution granularities, the OS maintains separate lists of page groups and pages for each of the different types of distribution granularities.

Figure 9:
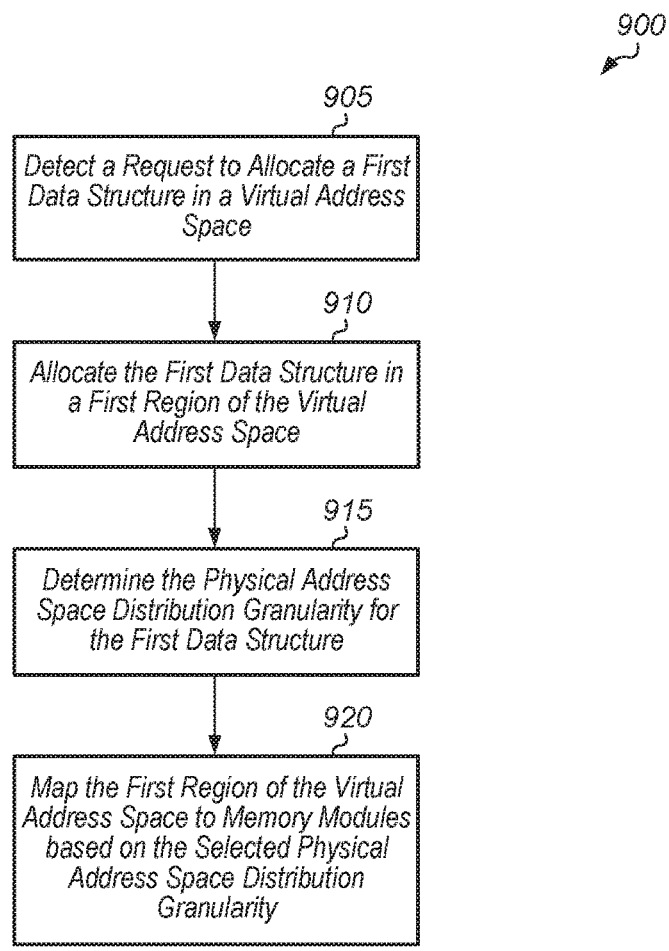
FIG. 9 is a generalized flow diagram illustrating one embodiment of a method for implementing per-page control of physical address space distribution among memory modules.
Figure 10:
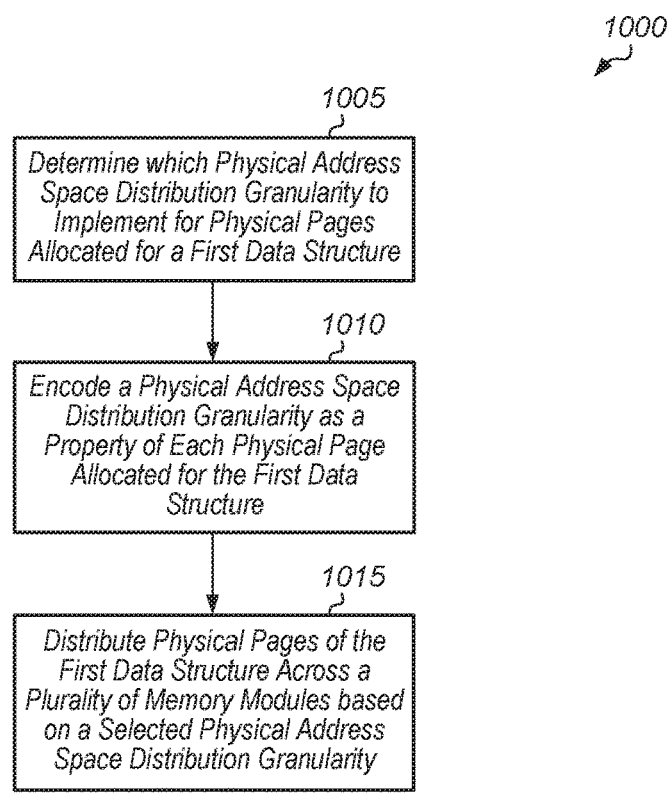
FIG. 10 is a generalized flow diagram illustrating another embodiment of a method for implementing per-page control of physical address space distribution among memory modules.
Figure 11:
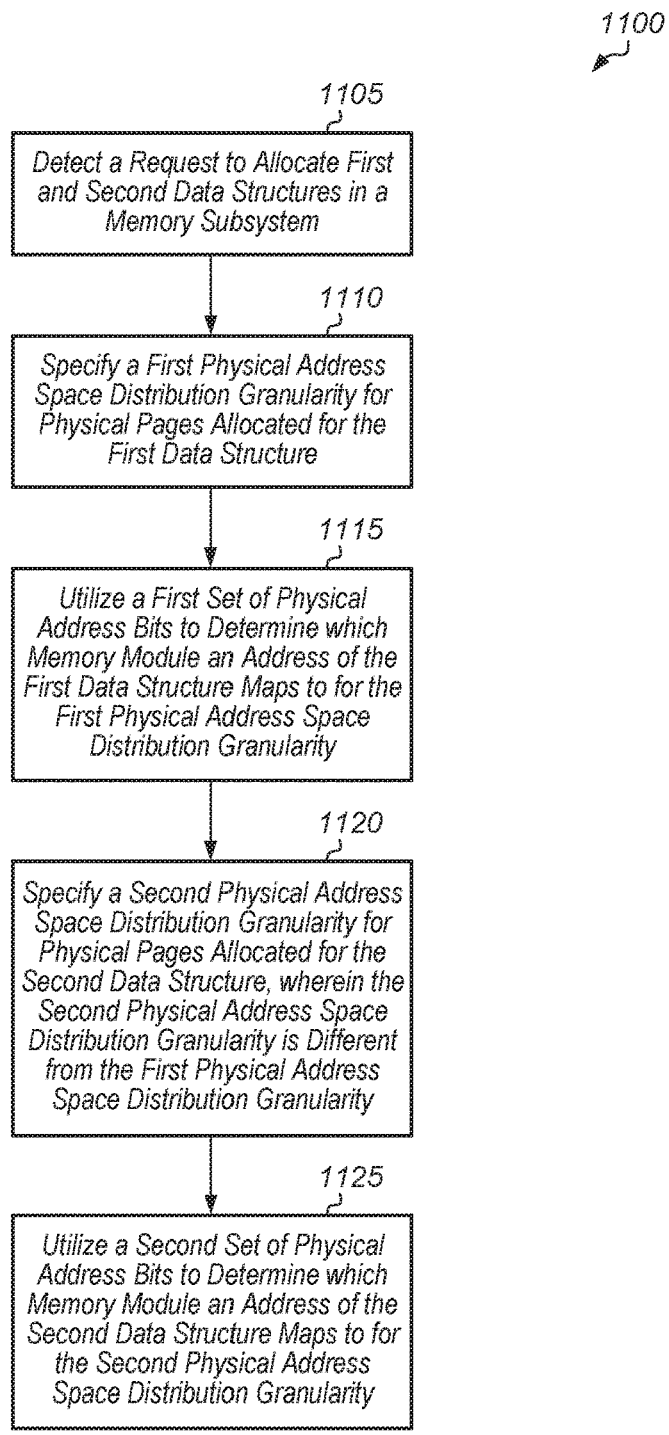
FIG. 11 is a generalized flow diagram illustrating one embodiment of a method for implementing multiple types of physical address space distribution granularities.

Referring now to FIG. 9, one embodiment of a method 900 for implementing per-page control of physical address space distribution among memory modules is shown. For purposes of discussion, the steps in this embodiment and those of FIGS. 10-11 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 900.

A system detects a request to allocate a first data structure in a virtual address space (block 905). In one embodiment, the system includes at least a plurality of processing units coupled to the plurality of memory modules. In response to detecting the request, the first data structure is allocated in a first region of the virtual address space (block 910). Also, the system determines the physical address space distribution granularity for the first data structure (block 915). Depending on the embodiment, the system determines the physical address space distribution granularity based at least in part on various sources of information such as directives or hints provided by the application, compile-time analysis of the application, profiling-based analysis of the application, and/or other factors. Next, the system maps the first region of the virtual address space to memory modules based on the selected physical address space distribution granularity (block 920). After block 920, method 900 ends.

Turning now to FIG. 10, another embodiment of a method 1000 for implementing per-page control of physical address space distribution among memory modules is shown. A system determines which physical address space distribution granularity to implement for physical pages allocated for a first data structure (block 1005). Next, the system encodes a physical address space distribution granularity as a property of each physical page allocated for the first data structure (block 1010). In one embodiment, system annotates page table entries (PTEs) for the physical pages of the first data structure with the selected physical address space distribution granularity. Also, the system distributes physical pages of the first data structure across a plurality of memory modules based on a selected physical address space distribution granularity (block 1015). After block 1015, method 1000 ends.

Referring now to FIG. 11, another embodiment of a method 1100 for implementing multiple types of physical address space distribution granularities is shown. A system detects a request to allocate first and second data structures in a memory subsystem (block 1105). In one embodiment, the memory subsystem includes a plurality of memory modules, with each memory module on a separate memory channel. The system specifies a first physical address space distribution granularity for physical pages allocated for the first data structure (block 1110). In one embodiment, the system specifies the first physical address space distribution granularity for the first data structure based on the type of application utilizing the first data structure, based on a software-generated hint, and/or based on one or more other factors. The system utilizes a first set of physical address bits to determine which memory module an address of the first data structure maps to, responsive to specifying the first physical address space distribution granularity for the first data structure (block 1115).

The system specifies a second physical address space distribution granularity for physical pages allocated for the second data structure, wherein the second physical address space distribution granularity is different from the first physical address space distribution granularity (block 1120). For example, in one embodiment, the first physical address space distribution granularity is a fine-grain layout and the second physical address space distribution granularity is a coarse-grain layout. In one embodiment, the system specifies the second physical address space distribution granularity for physical pages allocated for the second data structure based on the type of application utilizing the second data structure, based on a software-generated hint, and/or based on one or more other factors. The system utilizes a second set of physical address bits to determine which memory module an address of the second data structure maps to responsive to specifying the second physical address space distribution granularity for the second data structure (block 1125). It is assumed for the purposes of this discussion that the second set of physical address bits are different from the first set of physical address bits. After block 1125, method 1100 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a plurality of memory modules storing at least system software; and
   a plurality of processing units coupled to the plurality of memory modules;
   wherein the system software includes program instructions which are executable by the plurality of processing units to:
      determine which of at least two physical address space distribution granularities to implement for physical memory pages allocated for a first data structure, wherein a physical address space distribution granularity defines how pages are distributed across the plurality of memory modules;
      determine to convert the first data structure from a first physical address space distribution granularity to a second physical address space distribution granularity, wherein the first data structure includes a first physical memory page;
      determine that at least a second physical memory page will be affected by a conversion of the first data structure, wherein the second physical memory page is stored in an adjacent location to the first physical memory page, and wherein the second physical memory page is not part of the first data structure; and
      convert the first physical memory page and at least the second physical memory page as a page group from the first physical address space distribution granularity to the second physical address space distribution granularity.

2. The system as recited in claim 1, wherein the number of pages in the page group is equal to a number of memory modules in the plurality of memory modules.

3. The system as recited in claim 1, wherein the system software includes program instructions which are further executable by the plurality of processing units to keep memory blocks along a diagonal of the page group in place during conversion of the page group from the first physical address space distribution granularity to the second physical address space distribution granularity.

4. The system as recited in claim 3, wherein the system software includes program instructions which are further executable by the plurality of processing units to move other memory blocks of the page group between memory modules during conversion of the page group from the first physical address space distribution granularity to the second physical address space distribution granularity.

5. The system as recited in claim 1, wherein the system software includes program instructions which are further executable by the plurality of processing units to:
   determine which memory module an address maps to based on a first set of bits responsive to determining the first physical address space distribution granularity has been specified to be implemented; and
   determine which memory module an address maps to based on a second set of bits responsive to determining the second physical address space distribution granularity has been specified, wherein the second set of bits is different from the first set of bits.

6. The system as recited in claim 1, wherein the first physical address space distribution granularity is a fine-grain distribution and the second physical address space distribution granularity is a coarse-grain distribution, and wherein the fine-grain distribution maps a given address space to more memory modules than the coarse-grain distribution.

7. The system as recited in claim 1, wherein the system software includes program instructions which are further executable by the plurality of processing units to convert the physical pages allocated for the first data structure from the first physical address space distribution granularity to the second physical address space distribution granularity, responsive to information obtained during execution about application behavior for accessing the first data structure.

8. A method performed by a processing unit of a computing system, the method comprising:
   determining which of at least two physical address space distribution granularities to implement for physical memory pages allocated for a first data structure, wherein a physical address space distribution granularity defines how pages are distributed across a plurality of memory modules of the computing system;
   determining to convert the first data structure from a first physical address space distribution granularity to a second physical address space distribution granularity, wherein the first data structure includes a first physical memory page;
   determining that at least a second physical memory page will be affected by a conversion of the first data structure, wherein the second physical memory page is stored in an adjacent location to the first physical memory page, and wherein the second physical memory page is not part of the first data structure; and
   converting the first physical memory page and at least the second physical memory page as a page group from the first physical address space distribution granularity to the second physical address space distribution granularity.

9. The method as recited in claim 8, wherein the number of pages in the page group is equal to a number of memory modules in the plurality of memory modules.

10. The method as recited in claim 8, further comprising keeping memory blocks along a diagonal of the page group in place during conversion of the page group from the first physical address space distribution granularity to the second physical address space distribution granularity.

11. The method as recited in claim 10, further comprising moving other memory blocks of the page group between memory modules during conversion of the page group from the first physical address space distribution granularity to the second physical address space distribution granularity.

12. The method as recited in claim 11, further comprising:
  determining which memory module an address maps to based on a first set of bits responsive to determining the first physical address space distribution granularity has been specified to be implemented; and
  determining which memory module an address maps to based on a second set of bits responsive to determining the second physical address space distribution granularity has been specified, wherein the second set of bits is different from the first set of bits.

13. The method as recited in claim 8, wherein the first physical address space distribution granularity is a fine-grain distribution and the second physical address space distribution granularity is a coarse-grain distribution, and wherein the fine-grain distribution maps a given address space to more memory modules than the coarse-grain distribution.

14. The method as recited in claim 8, further comprising converting the physical pages allocated for the first data structure from the first physical address space distribution granularity to the second physical address space distribution granularity responsive to information obtained during execution about application behavior for accessing the first data structure.

15. An apparatus comprising:
  a memory subsystem comprising a plurality of memory modules and a plurality of memory channels, each of said memory channels coupled to a separate memory module of the plurality of memory modules; and
  a plurality of processing units coupled to the memory channels;
  wherein one or more of the plurality of processing units are configured to:
    determine which of at least two physical address space distribution granularities to implement for physical memory pages allocated for a first data structure in the memory subsystem, wherein a physical address space distribution granularity defines how pages are distributed across the plurality of memory modules;
    determine to convert the first data structure from a first physical address space distribution granularity to a second physical address space distribution granularity, wherein the first data structure includes a first physical memory page;
    determine that at least a second physical memory page will be affected by a conversion of the first data structure, wherein the second physical memory page is stored in an adjacent location to the first physical memory page, and wherein the second physical memory page is not part of the first data structure; and
    convert the first physical memory page and at least the second physical memory page as a page group from the first physical address space distribution granularity to the second physical address space distribution granularity.

16. The apparatus as recited in claim 15, wherein the number of pages in the page group is equal to a number of memory modules in the plurality of memory modules.

17. The apparatus as recited in claim 15, wherein the one or more processing units of the plurality of processing units are further configured to keep memory blocks along a diagonal of the page group in place during conversion of the page group from the first physical address space distribution granularity to the second physical address space distribution granularity.

18. The apparatus as recited in claim 17, wherein the one or more processing units of the plurality of processing units are further configured to move other memory blocks of the page group between memory modules during conversion of the page group from the first physical address space distribution granularity to the second physical address space distribution granularity.

19. The apparatus as recited in claim 18, wherein the one or more processing units of the plurality of processing units are further configured to:
  determine which memory module an address maps to based on a first set of bits responsive to determining the first physical address space distribution granularity has been specified to be implemented; and
  determine which memory module an address maps to based on a second set of bits responsive to determining the second physical address space distribution granularity has been specified, wherein the second set of bits is different from the first set of bits.

20. The apparatus as recited in claim 15, wherein the first physical address space distribution granularity is a fine-grain distribution and the second physical address space distribution granularity is a coarse-grain distribution, and wherein the fine-grain distribution maps a given address space to more memory modules than the coarse-grain distribution.

\* \* \* \* \*